(12) United States Patent
Gibot et al.

(10) Patent No.: US 6,427,481 B1
(45) Date of Patent: Aug. 6, 2002

(54) METHOD AND DEVICE FOR PACKAGING CARBON DIOXIDE SNOW IN A PLASTIC FILM

(75) Inventors: Claude Gibot, F-Clichy sous Bois; Gérard Lenfant, Creteil; Xavier Benedetti, Paris, all of (FR)

(73) Assignee: L'Air Liquide Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/948,784

(22) Filed: Sep. 10, 2001

(30) Foreign Application Priority Data

Sep. 11, 2000 (FR) .......................................... 00 11517

(51) Int. Cl.⁷ ............................................... F25D 3/08
(52) U.S. Cl. ............................... 62/530; 62/603; 62/62
(58) Field of Search ....................... 62/530, 603, 340, 62/344, 371, 457.2, 60, 62, 10, 12

(56) References Cited

U.S. PATENT DOCUMENTS

| 3,685,308 A | * | 8/1972 | Lundquist ....................... 60/60 |
| 4,069,282 A | * | 1/1978 | Gutermuth et al. ........... 264/28 |
| 4,127,008 A | * | 11/1978 | Tyree, Jr. ....................... 62/62 |
| 4,373,344 A | * | 2/1983 | Hinn .............................. 62/62 |
| 4,766,732 A | * | 8/1988 | Rubin ............................ 62/62 |
| 5,148,679 A |   | 9/1992 | Eve |
| 5,271,233 A |   | 12/1993 | Parker et al. |
| 5,638,697 A | * | 6/1997 | Reznikov et al. ............. 62/603 |

FOREIGN PATENT DOCUMENTS

| EP | 0 823 600 A2 | 7/1998 |
| FR | 2 518 237 | 6/1983 |
| FR | 2 604 243 | 12/1988 |
| FR | 2 780 145 | 12/1999 |
| FR | 2 783 904 | 3/2000 |

OTHER PUBLICATIONS

Search Report issued in French Application No. 00 11517.

* cited by examiner

Primary Examiner—Denise L. Esquivel
Assistant Examiner—Melvin Jones
(74) Attorney, Agent, or Firm—Burns, Doane, Swecker & Mathis, LLP

(57) ABSTRACT

The invention relates to a method for packaging carbon dioxide snow in a plastic film bag, in which method the following steps are employed:

a—a fluid which has a temperature below the dew point of the air is injected into and in contact with the plastic film bag, then b—the carbon dioxide snow is introduced into the plastic film bag, then c—the plastic film bag is closed.

The invention also relates to apparatus for implementing this method.

29 Claims, 2 Drawing Sheets

METHOD AND DEVICE FOR PACKAGING CARBON DIOXIDE SNOW IN A PLASTIC FILM

BACKGROUND OF THE INVENTION

1. Field of the Invention

The present invention relates to a method for packaging carbon dioxide snow in plastic bags.

2. Description of the Related Art

It is known that frozen or deep-frozen products, particularly food products which have to be kept at low temperature (of the order of −20° C. or under) with uninterrupted coldness from the time they are frozen or deep-frozen to the time of their use, require warehouses, transport facilities and stores fitted with refrigeration equipment, which at the present time is generally electrical. However, in many instances, for example for non-motorized transport, it is impossible to transport the products without taking them out of the refrigeration equipment in which they are stored, and the risk of the temperature rising is great if the weather conditions are unfavourable. With a view to avoiding such a temperature rise when they are being transported, it is common practice for the frozen or deep-frozen products to be placed in a dry ice (carbon dioxide ice) environment, the ice being procured for the party acquiring the products by the distributor of the products, generally free of charge. A certain misconception over cooling techniques on the part of the distributors and of the clients causes them usually to deliberately overestimate, as a precautionary measure, the amount of ice needed, and this results in significantly needless expenditure on the part of the distributor. In consequence, it has been proposed that carbon dioxide ice be replaced by carbon dioxide snow which is a relatively inexpensive product with a better cooling capability, its temperature of around −80° C. allowing the products to be kept cold for longer. Thus, application FR-A1-2 604 243 describes the dispensing of carbon dioxide snow into bags, boxes or containers that are to be placed with the products to be preserved. That application describes an apparatus for bagging carbon dioxide snow, comprising:

- means for continuously dispensing a porous flexible strip,
- means for shaping into a tube the strip which is forced through a pre-shaping sheath,
- a pipe for injecting liquid carbon dioxide anhydride, this pipe being arranged in the tube upstream of the pre-shaping sheath,
- a driving and shaping set arranged downstream of the reshaping sheath and acting on the tube filled with carbon dioxide snow,
- a station for cutting the tube and the solidified carbon dioxide snow.

When this type of bagging apparatus is used with a plastic film, a problem of closing the plastic tube is encountered. This is because it has been found that when the carbon dioxide snow, which is in pulverulent form as it leaves the carbon dioxide snow generator, is introduced into the plastic tube, particles of snow tend to be sent back to the generator. Numerous snow particles therefore remain in the space between the two edges of the film which are intended to be hot-welded together. The presence of this solid at −80° C. at the hot-welding jaws prevents effective closure of the bag. This phenomenon is all the more pronounced when the apparatus has not been operating for a certain period of time, for example for about half an hour or upon start-up.

SUMMARY OF THE INVENTION

The object of the present invention is to propose an apparatus for bagging carbon dioxide snow into plastic bags which does not exhibit the above problem.

To this end, the invention relates to a method for packaging carbon dioxide snow in a plastic film container, in which method the following steps are employed:

- a—a fluid which has a temperature below the dew point of the air is injected into and in contact with the plastic film container, then
- b—the carbon dioxide snow is introduced into the plastic film container, then
- c—the plastic film container is closed.

The invention also relates to a device for packaging carbon dioxide snow in plastic film, comprising:

- —means for dispensing and shaping the plastic film,
- —a source of liquid carbon dioxide,
- —a means for injecting a fluid which has a temperature below the dew point of air into and in contact with the shaped plastic film,
- —a carbon dioxide snow generator connected to the source of liquid carbon dioxide and positioned in such a way to fill the shaped plastic film,
- —means for sealing the shaped plastic film.

BRIEF DESCRIPTION OF THE FIGURES OF THE DRAWINGS

Other characteristics and advantages of the invention will become apparent upon reading the description which will follow. Embodiments and implementations of the invention are given by way of example, illustrated by the appended drawings in which.

DETAILED DESCRIPTION OF THE PREFERRED EMBODIMENTS

Figure 1:
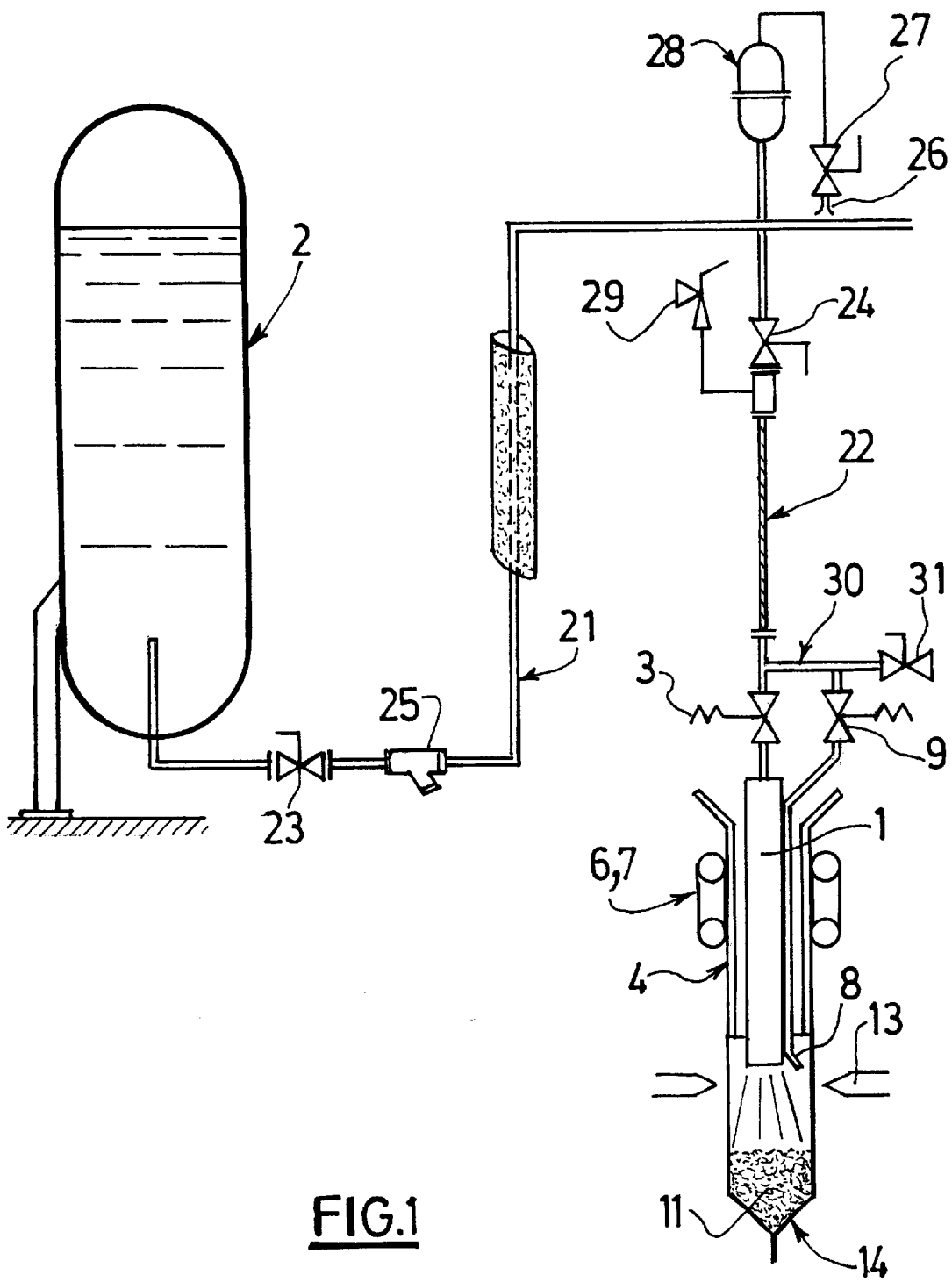
FIG. 1 is a schematic view of a device according to the invention.

The invention therefore relates to a method for packaging carbon dioxide snow in a plastic film container, in which method the following steps are employed:

- a—a fluid which has a temperature below the dew point of the air is injected into and in contact with the plastic film container, then
- b—the carbon dioxide snow is introduced into the plastic film container, then
- c—the plastic film container is closed.

One of the essential characteristics of the invention is that prior to introducing the carbon dioxide snow into the plastic film container, a fluid with a temperature below the dew point of the air is injected into and in contact with the plastic film container. The container can then be filled with carbon dioxide snow then closed, particularly by hot-welding, without any problem.

According to the preferred implementation of the invention, the fluid which has a temperature below the dew point of the air is liquid carbon dioxide. Thus, during step a, all that is required is for a small amount of liquid carbon dioxide to be injected so as to cool the interior wall of the plastic film container to a temperature below the dew point of the air. In general, a few grams of liquid carbon dioxide at −80° C. or a squirt of the latter from a capillary tube suffice.

The plastic film is generally chosen from materials allowing removal of the gaseous carbon dioxide resulting from the sublimation of the carbon dioxide snow. This property can be achieved by porosity of the plastic film which may be micro porous or have micro perforations. Thus, the plastic film can be chosen so that the perforations allow the significant mass of expansion gases to escape and also retain and contain the fine crystals that make up the carbon dioxide snow. These micro perforations may be produced at the time of manufacture of the plastic film or during the method according to the invention, for example in an earlier step of preparing the plastic film such as by passing the plastic film over perforating spikes. As a preference, the plastic film is hot-weldable. It is also preferable, on the one hand, for it to be strong enough to withstand the pressure of the carbon dioxide snow while it is being filled and handled and, on the other hand, for it to exhibit sufficient thermal insulation to avoid any risk of cold burns when it is being handled; these two properties may be obtained by choosing a sufficiently great thickness of material. In addition, where the container is intended for use in the food industry, the material chosen must naturally be appropriate to this use. Finally, it is generally preferable for the plastic film to be biodegradable, in order to respect the environment. According to the preferred implementation of the invention, the plastic film is microperforated polypropylene 30 mm thick.

According to an alternative form of the invention, the method may comprise an earlier step of shaping the container, for example shaping a strip of plastic film into a tube by hot-welding.

According to a preferred implementation of the invention, steps a, b and c are employed in step. The durations of steps a and c are generally fixed and constant, while the duration of step b may vary according to the amount of carbon dioxide snow that is to be produced and packaged in the plastic film.

According to a variant of the invention, the gaseous carbon dioxide resulting from the vaporization of the liquid carbon dioxide injected during step a into the container is removed along the carbon dioxide snow generator. This makes it possible to cool the carbon dioxide snow generator and improve the ratio of conversion of liquid carbon dioxide into snow. It is possible to obtain the optimum efficiency of conversion of liquid carbon dioxide into carbon dioxide snow, which is 47%. The gaseous carbon dioxide removed along the carbon dioxide snow generator is generally discharged away from the carbon dioxide snow packaging area, for safety reasons.

In general, the liquid carbon dioxide which is injected into and in contact with the plastic film container during step a, and the carbon dioxide snow come from the same source of liquid carbon dioxide. The source of carbon dioxide may be a cylinder of carbon dioxide under pressure in the liquid state but is preferably rather a source of refrigerated low-pressure liquid carbon dioxide because this type of source gives a better efficiency in terms of carbon dioxide snow generation. In this second instance, the conditions under which the source of liquid carbon dioxide is stored may, for example, be a temperature of $-20°$ C. and a temperature of about 20 bar, or even less.

When the liquid carbon dioxide under pressure is released and transferred into the carbon dioxide snow generator, it expands to atmospheric pressure, which gives rise to the formation of a solid in pulverulent form known by the name of carbon dioxide snow, at a temperature very much below $0°$ C., of the order of $-80°$ C., and of carbon dioxide in the gaseous state. More precisely, a study of the Mollier diagram shows that a given amount of liquid carbon dioxide at a pressure of 20 bar is converted 53% into gas and 47% into solid.

The invention also relates to a device for packaging carbon dioxide snow in plastic film, comprising:

means for dispensing, shaping and moving the plastic film, a source of liquid carbon dioxide, a means for injecting a fluid which has a temperature below the dew point of air into and in contact with the shaped plastic film and connected to a source of the said fluid, a carbon dioxide snow generator connected to the source of liquid carbon dioxide and positioned in such a way as to fill the shaped plastic film, means for sealing the shaped plastic film.

The means of dispensing, shaping and moving the plastic film are those generally employed in known packaging devices. In general, these means consist in constantly dispensing a strip of plastic film, in shaping it into a tube by winding it over a preshaping sheath, in sealing the two edges of the tube which meet and in sliding the tube obtained downstream of the preshaping sheath. The means of sealing the plastic film once the latter has been shaped make it possible for the tube to be closed by hot-welding and then cut at the welded film stage in order to obtain a bag. In this case, the carbon dioxide snow generator is placed inside the shaping sheath so that the snow produced is directed into the bag being formed. As a preference, the means for distributing and shaping the plastic film are positioned in such a way as to form a vertical bag, the opening of which is in the top side, and the carbon dioxide snow generator is oriented vertically so that the carbon dioxide snow formed falls under gravity into the shaped plastic bag and so that once the latter has been sealed and cut, the bag containing the carbon dioxide snow also drops under gravity.

As a preference, the means for injecting the fluid which is at a temperature below the dew point of the air is a capillary tube directed towards the interior surface of the shaped plastic film. According to an advantageous variant, this means is connected to the source of liquid carbon dioxide. A valve, generally an electrically-operated valve, is inserted between the capillary tube and the source of liquid carbon dioxide so as to start and stop the supply of liquid carbon dioxide. A valve, generally an electrically-operated valve, is also inserted between the carbon dioxide snow generator and the source of liquid carbon dioxide so as to start and stop the delivery of carbon dioxide snow. When the device according to the invention is switched on, the electrically operated valve of the capillary is opened, then closed, before the electrically-operated valve of the carbon dioxide snow generator is opened. The valves may be controlled by a timer determining the times that they remain open and therefore the amount of carbon dioxide snow to be packaged. The timer may be started by a pay station. According to one form of the previous variant of the device, the latter comprises at least means for removing the gaseous carbon dioxide. If the device comprises a carbon dioxide snow generator placed inside a sheath for the pre-shaping of the plastic film, the means for removing the gas may consist of the space formed between the outer wall of the generator and the interior wall of the sheath.

Figure 2:
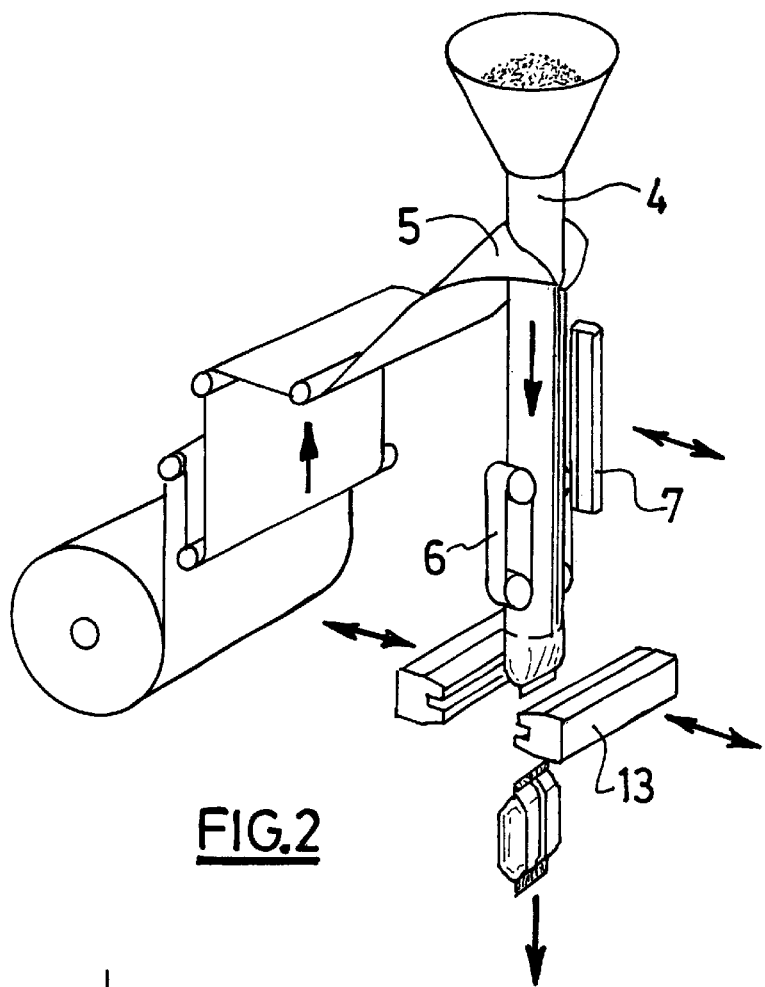
FIG. 2 is a schematic view of a bagging device.
Figure 3:
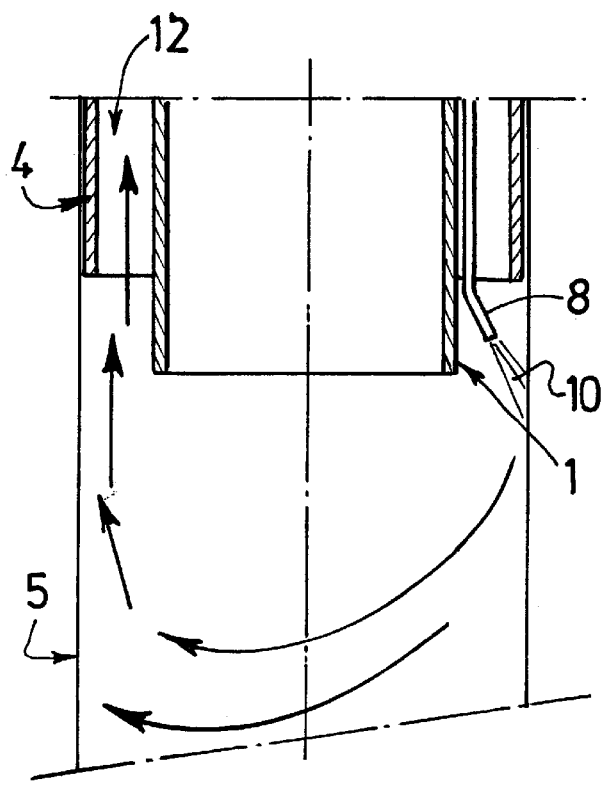
FIG. 3 is a detail of the device of FIG. 1.

FIGS. 1, 2 and 3 illustrate the device and the method according to the invention. The carbon dioxide snow generator (1) is connected to a refrigerated reservoir of liquid carbon dioxide (2) by a lagged pipe (21) and a lagged hose (22). A filter (25) and isolating valves (23, 24) may be positioned between the source of carbon dioxide (2) and the generator (1), it being possible in particular for one of them to be placed between the pipe and the hose. The lagged pipe may also have an orifice (26) connected to an isolating valve (27) leading to a vent pot (28), the lower part of the vent pot being connected to the lagged pipe (21). A valve (29) may also be present between the hose (22) and the pipe (21).

The hose (22) leads to a pipe (30) which splits into three:

towards the generator (1), towards the capillary that injects the liquid carbon dioxide (8), towards a bleed. The bleed may be connected to the source of carbon dioxide (2) (this connection is not depicted in the figure).

These three branches of the pipe downstream of the hose (22) are each fitted with valves:

an electrically-operated valve (3) in the case of the branch connected to the generator (1), an electrically-operated valve (9) in the case of the branch connected to the capillary (8), a bleed valve (31) in the case of the last branch.

The carbon dioxide snow generator (1) is placed inside the shaping sheath (4) of a vertical bagger.

When the method is implemented, the plastic film (5) is rolled up on itself to form a tube which is taken up by the shaping sheath (4). The film is wound in such a way as to bring the two vertical edges of the film closer together: these edges are made to overlap, and are then bonded together by hot-welding by the vertical sealing means (7) along their entire length. The shaped tube is moved downwards by guide pulleys (6) so as to form a plastic bag (14) into which carbon dioxide snow can be introduced. In FIG. 2, the arrows indicate the movements of the shaping, movement and sealing means. Once the bag has been shaped, the electrically-operated valve (9) positioned upstream of the capillary that injects the liquid carbon dioxide (8) opens: the liquid carbon dioxide (10) leaves the end of the capillary (8) oriented so as to direct the liquid carbon dioxide into and in contact with the shaped plastic bag. The electrically-operated valve (9) is then closed and the electrically-operated valve (3) is opened: the generator (1) then produces carbon dioxide snow (11) which drops under gravity into the plastic bag (14). The electrically-operated valve (3) is closed. The carbon dioxide gas is removed via the space (12) formed between the sheath (4) that shapes the plastic film and the carbon dioxide snow generator (1). Finally, the sealing tools (13) of the bagger close the plastic by hot-welding and cut the welded plastic to form a closed bag.

By implementing a device such as the one described hereinabove, the time which elapses between the opening of the electrically-operated valve of the capillary and the obtaining of the bag of carbon dioxide snow is just a few seconds, for example about 12 seconds, for an injection of a 250 g dose of carbon dioxide snow, the time being allocated as follows:

2 seconds for opening the electrically-operated valve of the capillary, 7 seconds for injecting the carbon dioxide snow, 3 seconds for making the bag.

No problems are encountered in hot-welding the plastic bag closed even if the device is not operated continuously.

What is claimed is:

1. Method for packaging carbon dioxide snow in a plastic film container, in which method the following steps are employed:

a—a fluid which has a temperature below the dew point of the air is injected into and in contact with the plastic film container, then b—the carbon dioxide snow is introduced into the plastic film container, then c—the plastic film container is closed.

2. Method according to claim 1, characterized in that the fluid which has a temperature below the dew point is liquid carbon dioxide.

3. Method according to claim 1, characterized in that during step c, the plastic container is closed by thermal welding.

4. Method according to claim 1, characterized in that the plastic film is chosen from materials allowing the removal of the gaseous carbon dioxide that results from the sublimation of the carbon dioxide snow.

5. Method according to claim 4, characterized in that the plastic film can be hot welded.

6. Method according to claim 1, characterized in that it comprises a prior step of shaping the container.

7. Method according to claim 1, characterized in that steps a, b and c are employed in step.

8. Method according to claim 2, characterized in that the gaseous carbon dioxide resulting from the vaporization of the liquid carbon dioxide injected is removed along the outer wall of the carbon dioxide snow generator.

9. Method according to claim 2, characterized in that the liquid carbon dioxide and the carbon dioxide snow come from the same source of liquid carbon dioxide.

10. Method according to claim 2, characterized in that during step c, the plastic container is closed by thermal welding.

11. Method according to claim 2, characterized in that the plastic film is chosen from materials allowing the removal of the gaseous carbon dioxide that results from the sublimation of the carbon dioxide snow.

12. Method according to claim 2, characterized in that it comprises a prior step of shaping the container.

13. Method according to claim 2, characterized in that steps a, b and c are employed in step.

14. Method according to claim 3, characterized in that the plastic film is chosen from materials allowing the removal of the gaseous carbon dioxide that results from the sublimation of the carbon dioxide snow.

15. Method according to claim 3, characterized in that it comprises a prior step of shaping the container.

16. Method according to claim 3, characterized in that steps a, b and c are employed in step.

17. Method according to claim 3, characterized in that the gaseous carbon dioxide resulting from the vaporization of the liquid carbon dioxide injected is removed along the outer wall of the carbon dioxide snow generator.

18. Method according to claim 3, characterized in that the liquid carbon dioxide and the carbon dioxide snow come from the same source of liquid carbon dioxide.

19. Device for packaging carbon dioxide snow in plastic film, comprising:

means for dispensing, shaping and moving the plastic film, a source of liquid carbon dioxide, a means for injecting a fluid which has a temperature below the dew point of air into and in contact with the shaped plastic film and connected to a source of the said fluid, a carbon dioxide snow generator connected to the source of liquid carbon dioxide and positioned in such a way as to fill the shaped plastic film, means for sealing the shaped plastic film.

20. Device according to claim 19, characterized in that the means for injecting the fluid which has a temperature below the dew point of the air is a capillary tube oriented towards the interior surface of the shaped plastic film.

21. Device according to claim 19, characterized in that the means for injecting a fluid which has a temperature below the dew point of air is connected to the source of liquid carbon dioxide.

22. Device according to claim 19, characterized in that a valve is inserted between the carbon dioxide snow generator and the source of liquid carbon dioxide, so as to start and stop the supply of carbon dioxide snow.

23. Device according to claim 22, characterized in that the valve is operated by a timer determining the time it remains open.

24. Device according to claim 20, characterized in that the means for injecting a fluid which has a temperature below the dew point of air is connected to the source of liquid carbon dioxide.

25. Device according to claim 20, characterized in that a valve is inserted between the carbon dioxide snow generator and the source of liquid carbon dioxide, so as to start and stop the supply of carbon dioxide snow.

26. Device according to claim 21, characterized in that it comprises, above the shaped plastic film, a means for removing the gaseous carbon dioxide.

27. Device according to claim 21, characterized in that a valve is inserted between the carbon dioxide snow generator and the source of liquid carbon dioxide, so as to start and stop the supply of carbon dioxide snow.

28. Device according to claim 26, characterized in that a valve is inserted between the carbon dioxide snow generator and the source of liquid carbon dioxide, so as to start and stop the supply of carbon dioxide snow.

29. Device according to claim 23, characterized in that the timer is started by a pay station.

* * * * *